(12) United States Patent
Omura

(10) Patent No.: US 6,472,468 B1
(45) Date of Patent: Oct. 29, 2002

(54) FLUORINATED POLYSILOXANE, MAKING METHOD, AND FIBER OR FABRIC TREATING AGENT COMPOSITION

(75) Inventor: Naoki Omura, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 2 days.

(21) Appl. No.: 09/711,894

(22) Filed: Nov. 15, 2000

(30) Foreign Application Priority Data

Nov. 15, 1999 (JP) .............................. 11-324286

(51) Int. Cl.$^7$ .................................. C08H 3/03
(52) U.S. Cl. ........................ 524/806; 442/81; 528/38; 528/42
(58) Field of Search ................ 528/38, 42; 442/81; 524/806

(56) References Cited

U.S. PATENT DOCUMENTS

| | | | | |
|---|---|---|---|---|
| 4,024,306 A | * | 5/1977 | Takamizawa et al. | |
| 4,247,592 A | | 1/1981 | Kalinowski | |
| 4,996,280 A | * | 2/1991 | Saho et al. | |
| 5,442,011 A | * | 8/1995 | Halling | |
| 5,702,509 A | * | 12/1997 | Pellerite et al. | 106/2 |
| 5,969,075 A | * | 10/1999 | Inoue | |
| 6,251,989 B1 | * | 6/2001 | Edelmann et al. | |

FOREIGN PATENT DOCUMENTS

| | | |
|---|---|---|
| EP | 0157499 | 10/1985 |
| EP | 0159120 | 10/1985 |
| GB | 1249118 | 2/1969 |
| JP | 481480 | 1/1973 |
| JP | 5443614 | 12/1979 |
| JP | 5734673 | 9/1982 |
| JP | 60185879 | 9/1985 |
| JP | 60185880 | 9/1985 |
| JP | 6461576 | 3/1989 |
| JP | 586197 | 4/1993 |
| JP | 8109580 | 4/1996 |
| JP | 2544935 | 7/1996 |

* cited by examiner

*Primary Examiner*—Robert Dawson
*Assistant Examiner*—Marc S Zimmer
(74) *Attorney, Agent, or Firm*—Birch, Stewart, Kolasch & Birch, LLP

(57) ABSTRACT

A fluorinated polysiloxane having at least one unit of the following general formula (1) and containing at least one aminoalkyl group attached to a silicon atom in a molecule is novel.

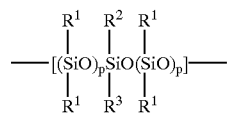

(1)

$R^1$ is a monovalent hydrocarbon group of 1–20 carbon atoms, $R^2$ is a monovalent hydrocarbon group containing at least three fluorine atoms, $R^3$ is an organoxy group: —$OR^1$, and p is 2 to 200. When fibers are treated with the fluorinated polysiloxane, it imparts excellent water and oil repellency and good texture.

18 Claims, No Drawings

FLUORINATED POLYSILOXANE, MAKING METHOD, AND FIBER OR FABRIC TREATING AGENT COMPOSITION

BACKGROUND OF THE INVENTION

In the prior art, a variety of organopolysiloxanes including dimethylpolysiloxane, epoxy group-containing polysiloxanes, and aminoalkyl group-containing polysiloxanes are widely used as a treating agent for imparting softness, smoothness and other desirable properties to various fibers and fibrous materials. Among others, aminoalkyl group-containing polysiloxanes are most often used since they can impart satisfactory softness to various fibers and fibrous materials. JP-B 48-1480, JP-B 54-43614, JP-B 57-43673, JP-A 60-185879, JP-A 60-185880, and JP-A 64-61576 disclose fiber or fabric treating agents comprising as an active ingredient organopolysiloxanes having aminoalkyl groups such as —$C_3H_6NH_2$ and —$C_3H_6NHC_2H_4NH_2$. These fiber or fabric treating agents are widely used because of softness improvement.

Recently, fluorochemical fiber or fabric treating agents are used for imparting water and oil repellency. Since the treated fabric is deteriorated in texture, it becomes customary to use silicone softeners in combination with fluorochemical water/oil repellents.

However, when the prior art dimethylpolysiloxanes, especially organopolysiloxanes having aminoalkyl groups such as —$C_3H_6NH_2$ and —$C_3H_6NHC_2H_4NH_2$ are used in combination with the fluorochemical water/oil repellents, they are incompatible, and water and oil repellency is rather exacerbated.

More particularly, an aminoalkyl group-containing organopolysiloxane of a polyether chain having a relatively low molecular weight is relatively compatible with the fluorochemical water/oil repellents, but adversely affects water repellency because of the hydrophilicity of polyether.

An attempt was made to introduce a fluorinated group into a silicone softener for imparting water and oil repellency while a variety of fluorinated organopolysiloxanes were proposed. For example, Japanese Patent No. 2,544,935 discloses a method of synthesizing a fluorinated organopolysiloxane by reacting an amino-modified silicone (e.g., modified with —$C_3H_6NHC_2H_4NH_2$) with a methyl perfluoroakylcarboxylate. JP-A 5-86197 discloses a method of synthesizing a fluorinated organopolysiloxane by reacting an amino-modified silicone with a perfluoroalkylsulfonic amide. JP-A 8-109580 discloses a method of synthesizing a fluorinated organopolysiloxane by reacting an amino-modified silicone with methyl carboxylate-modified hexafluoropropylene oxide.

These fluorinated organopolysiloxanes, however, have the problem that they improve oil repellency, but not to a fully satisfactory extent, and need a long time of reaction upon their synthesis.

SUMMARY OF THE INVENTION

An object of the invention is to provide a fluorinated polysiloxane which is easy to synthesize, can impart both water and oil repellency when used alone as a silicone softener, and does not exacerbate water repellency when used in combination with a fluorochemical water/oil repellent. Another object is to provide a method for preparing the same. A further object is to provide a fiber or fabric treating agent composition comprising the same.

It has been found that a fluorinated polysiloxane containing a linkage or group in which a monovalent hydrocarbon group containing at least three fluorine atoms and an organoxy group are attached to a common silicon atom as represented by the formula (1) or (2) and at least one aminoalkyl group attached to a silicon atom in a molecule, is obtained by effecting alcohol-elimination reaction among a both end hydroxyl-blocked organopolysiloxane of the formula (5), a fluorinated triorganoxysilane of the formula (6), and an aminoalkyl group-containing organoxysilane of the formula (7), all the formulas being shown later. This fluorinated polysiloxane, when fibers are treated therewith, can impart both water and oil repellency to the fibers and maintain a better texture than conventional fluorochemical oil repellents, and is thus suitable as a fiber or fabric treating agent. It has also been found that the fluorinated polysiloxane is effective as a paint additive, releasing agent and lubricant.

DESCRIPTION OF THE PREFERRED EMBODIMENT

In a first aspect, the invention provides a fluorinated polysiloxane comprising at least one unit of the following general formula (1) and containing at least one aminoalkyl group attached to a silicon atom in a molecule.

(1)

In a second aspect, the invention provides a fluorinated polysiloxane having at least one terminal group of the following general formula (2) and containing at least one aminoalkyl group attached to a silicon atom in a molecule.

(2)

In formulas (1) and (2), $R^1$ is a substituted or unsubstituted monovalent hydrocarbon group of 1 to 20 carbon atoms, $R^2$ is a monovalent hydrocarbon group containing at least three fluorine atoms, $R^3$ is an organoxy group represented by —$OR^1$ wherein $R^1$ is as defined above, and p is a positive number of from 2 to 200.

Illustrative examples of the monovalent hydrocarbon group represented by $R^1$ include alkyl groups such as methyl, ethyl, propyl, butyl, pentyl, hexyl, octyl, decyl, dodecyl, tetradecyl, octadecyl, and eicosyl, alkenyl groups such as vinyl and allyl, aryl groups such as phenyl and tolyl, cycloalkyl groups such as cyclopentyl and cyclohexyl, and substituted ones of the foregoing groups in which some or all of the hydrogen atoms attached to carbon atoms are replaced by halogen atoms, such as chloromethyl, trifluoropropyl, and chlorophenyl. Of these, methyl, phenyl and/or trifluoropropyl account for at least 90 mol % of $R^1$.

$R^2$ is a monovalent hydrocarbon group containing at least three fluorine atoms, as exemplified by a group of the following general formula (3).

—$CH_2CH_2C_nF_{2n+1}$ (3)

The letter n is a positive number of at least 3, preferably 3 to 10 and more preferably 5 to 8. If n is less than 3, satisfactory water repellency does not manifest. With n in excess of 10, water repellency is no longer enhanced and the organopolysiloxane becomes expensive. Illustrative examples of $R^2$ are —$CH_2CH_2C_5F_{11}$, —$CH_2CH_2C_6F_{13}$, —$CH_2CH_2C_7F_{15}$, —$CH_2CH_2C_8F_{17}$, —$CH_2CH_2C_9F_{19}$, and —$CH_2CH_2C_{10}F_{21}$.

$R^3$ is an organoxy group represented by —$OR^1$ wherein $R^1$ is as defined above, preferably an alkoxy group of 1 to 6 carbon atoms. Illustrative examples of $R^3$ are methoxy, ethoxy and propoxy, with the methoxy being most preferred.

The letter p is a positive number of from 2 to 200, and preferably from 10 to 100.

The fluorinated polysiloxane contains at least one aminoalkyl group attached to a silicon atom. The aminoalkyl group is preferably represented by the following general formula (4):

wherein $R^4$ is a divalent hydrocarbon group of 1 to 6 carbon atoms, $R^5$ and $R^6$ each are hydrogen or a monovalent hydrocarbon group of 1 to 8 carbon atoms, and "a" is equal to 0, 1 or 2.

The divalent hydrocarbon groups represented by $R^4$ include alkylene groups. The monovalent hydrocarbon groups represented by $R^5$ and $R^6$ include alkyl groups, aryl groups such as phenyl, and alkenyl groups such as vinyl. Two $R^6$ groups may be the same or different.

The aminoalkyl group is incorporated as the unit shown below.

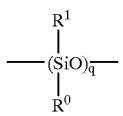

Herein, $R^0$ is an aminoalkyl group such as a group of formula (4); $R^1$ is as defined above; and q is such a number that the aminoalkyl group may account for 0.2 to 10 mol % based on the entire silicon atoms.

It is requisite that at least one alkylamino group be included in the molecule although it is preferred that the aminoalkyl group account for 0.2 mol % to 10 mol % and especially 0.5 mol % to 5.5 mol %, based on the entire silicon atoms. If the aminoalkyl group content is less than 0.2 mol%, full reaction may not take place between a fluorinated triorganoxysilane and a both end hydroxyl-blocked organopolysiloxane. An aminoalkyl group content of more than 10 mol % may cause yellowing of treated fibers.

The fluorinated polysiloxane containing at least one unit of formula (1) may have any desired terminal group. Exemplary terminal groups are dialkylhydroxysilyl, trialkylsilyl, alkyldialkoxysilyl, dialkylalkoxysilyl and groups of formula (2). Of these, dialkylhydroxysilyl, trialkylsilyl and alkyldialkoxysilyl groups are preferred for stability.

Illustrative, non-limiting, examples of the fluorinated polysiloxane are given below.

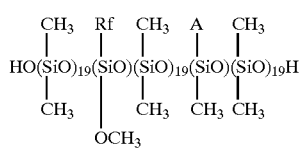

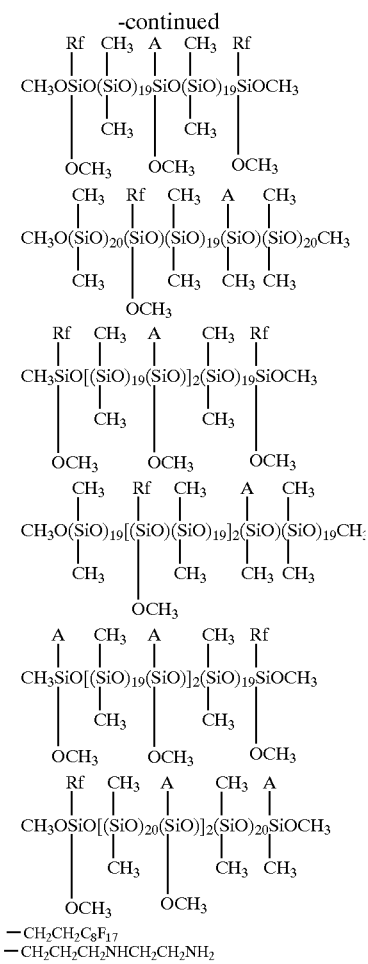

Rf: —$CH_2CH_2C_8F_{17}$
A: —$CH_2CH_2CH_2NHCH_2CH_2NH_2$

The invention also provides a method for preparing the fluorinated polysiloxane. The method involves the step of effecting alcohol-elimination reaction among (A) a both end hydroxyl-blocked organopolysiloxane of the following general formula (5), (B) a fluorinated triorganoxysilane of the following general formula (6), and (C) an aminoalkyl group-containing organoxysilane of the following general formula (7).

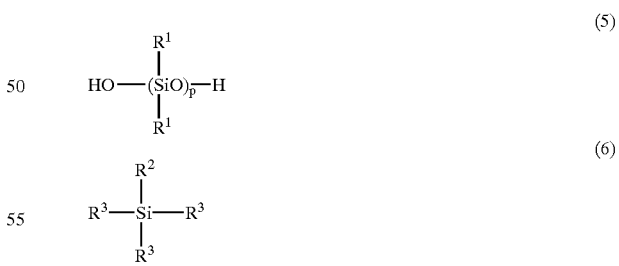

In formulas (5), (6) and (7), $R^1$, $R^2$, $R^3$ and p are as defined above, $R^0$ is an aminoalkyl group such as a group of the formula (4), and b is equal to 0 or 1.

In formula (5), p is a positive number of 2 to 200 as mentioned above. If p is less than 2, the silanol becomes unstable, allowing condensation reaction to take place parallel to the reaction with components (B) and (C), resulting in cyclic by-products. If p is more than 200, the content of fluorinated group becomes lower, leading to inferior of oil repellency. For this reason, p is a positive number of $2 \leq p \leq 200$, and preferably $10 \leq p \leq 100$. $R^1$ is as defined above, and preferably at least 90 mol % of $R^1$ is methyl, phenyl and/or trifluoropropyl. Illustrative examples of the organopolysiloxane of formula (5) are given below.

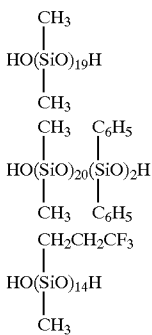

In formula (6), $R^2$ and $R^3$ are as defined in formula (1). $R^2$ is preferably of the general formula (3), with —$CH_2CH_2C_8F_{17}$ being most preferred for ease of synthesis. $R^3$ is most preferably methoxy, which allows for quick progress of alcohol-elimination reaction. The following is the most preferred example of the fluorinated triorganoxysilane of formula (6).

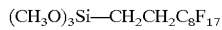

Component (C) not only acts as an alcohol-eliminating catalyst for components (A) and (B), but is also incorporated in the fluorinated polysiloxane wherein it imparts softness. Illustrative examples of the aminosilane are given below.

$(CH_3O)_3SiCH_2CH_2CH_2NH_2$
$(CH_3O)_3SiCH_2CH_2CH_2NHCH_2CH_2NH_2$
$(CH_3O)_3SiCH_2CH_2CH_2NHCH_2CH_2NHCH_2CH_2NH_2$

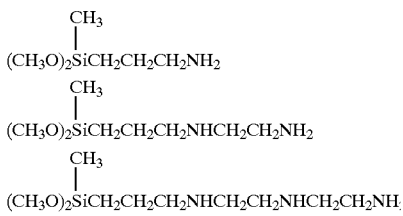

The preferred conditions for reaction among components (A), (B) and (C) include a temperature of about 50 to 180° C and a time of about 3 to 20 hours although they vary depending on the reactivity of silanol (A), the reactivity of alkoxy group in (B), and the type of aminosilane (C). By effecting reaction under such conditions, a fluorinated polysiloxane containing units of formula (1) or (2) is readily obtained. In order that efficient reaction proceed, reaction is preferably effected while removing the alcohol from the system.

Reaction is generally carried out in the absence of a solvent. If component (A) is viscous, a polar solvent such as acetone or methyl ethyl ketone is conveniently used for the reaction. If alcohol-elimination reaction of component (B) is slow, an amine such as ethylene diamine or an alkali catalyst such as sodium hydroxide may be used.

Components (B) and (A) are preferably used in such amounts that the molar ratio of (B)/(A) may range from 0.5/1 to 2.0/1. If (B)/(A) is less than 0.5, a more amount of the polysiloxane which has not been converted to a fluorinated polysiloxane is left. If (B)/(A) is greater than 2, a more amount of the fluorinated alkoxysilane is left.

In addition to the above conditions, the fluorinated polysiloxane should preferably have a fluorine content of at least 5% by weight, more preferably 5 to 50% by weight, and most preferably 15 to 35% by weight. With a fluorine content of less than 5% by weight, the desired water repellent effect may not develop.

Component (C) should contain at least one aminoalkyl group in the molecule. It is preferred that the aminoalkyl group account for 0.2 mol % to 10 mol % and especially 0.5 mol % to 5.5 mol %, based on the entire silicon atoms. If the aminoalkyl group content is less than 0.2 mol %, full reaction may not take place between a fluorinated triorganoxysilane and a both end hydroxyl-blocked organopolysiloxane. An aminoalkyl group content of more than 10 mol % may cause yellowing of treated fibers.

It is a common practice in the art to modify amino group-containing polysiloxanes by reacting with organic acids, inorganic acids or epoxy compounds. If desired, the fluorinated polysiloxane of the invention is modified at aminoalkyl groups with organic acids, inorganic acids or epoxy compounds. Exemplary organic acids are formic acid, acetic acid, acetic anhydride and propanoic acid, with acetic acid and acetic anhydride being preferred. Exemplary inorganic acids are hydrochloric acid and phosphoric acid. Where an epoxy compound is used for modification, its amount should not compromise water repellency. Exemplary epoxy compounds are glycidol and those of the following general formula (8):

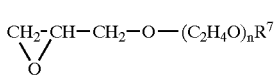

wherein $R^7$ is hydrogen or a monovalent hydrocarbon group such as an alkyl group of 1 to 8 carbon atoms, and n is a positive number of 0 to 10. $R^7$ is preferably hydrogen or butyl.

The fiber or fabric treating agent composition comprising as a main component the fluorinated polysiloxane according to the invention is typically prepared by dissolving the polysiloxane in organic solvents such as acetone, methyl ethyl ketone, methyl isobutyl ketone, and Freon®; or as emulsions using nonionic, anionic, cationic or ampholytic surfactants. Although the emulsifiers used herein are not critical, exemplary nonionic surfactants include ethoxylated higher alcohols, ethoxylated alkyl phenols, polyhydric alcohol fatty acid esters, ethoxylated polyhydric alcohol fatty acid esters, ethoxylated fatty acids, ethoxylated fatty acid amides, sorbitol, sorbitan fatty acid esters, ethoxylated sorbitan fatty acid esters, and sucrose fatty acid esters, with their HLB being preferably in the range of 5 to 20, especially 10 to 16. Exemplary anionic emulsifiers include higher alcohol sulfate ester salts, alkyl phenyl ether sulfate ester salts, alkylbenzenesulfonate salts, higher alcohol phosphate ester salts, ethoxylated higher alcohol sulfate ester salts, ethoxylated alkyl phenyl ether sulfate ester salts, and ethoxylated higher alcohol phosphate salts. Exemplary cationic emulsifiers include alkyltrimethylammonium chlorides, alkylamine hydrochlorides, coconut amine acetate, alkylamine acetates, and alkylbenzenedimethylammonium chlorides. Exemplary ampholytic surfactants include N-acylamidopropyl-N,N-dimethylammoniobetaines and N-acylamidopropyl-N,N'-dimethyl-N'-β- hydroxypropylammonio-betaines. An appropriate amount of the emulsifier or surfactant used is about 5 to 50 parts, more preferably about 10 to 30 parts by weight per 100 parts by weight of the fluorinated polysiloxane. Upon emulsification, water is preferably used in such an amount as to give a fluorinated polysiloxane concentration of about 10 to 80% by weight, especially about 20 to 60% by weight.

The emulsion may be prepared by prior art well-known methods. For example, the fluorinated polysiloxane is mixed with a surfactant and emulsified in water by means of an emulsifying machine such as a homomixer, homogenizer, colloid mill, line mixer, Universal Mixer®, Ultra Mixer®, Planetary Mixer®, Combi Mix® or three-roll mixer.

In the fiber or fabric treating agent composition, additives may be added insofar as they do not compromise the benefits of the invention. Suitable additives are anti-creasing agents, flame retardants, antistatic agents antioxidants, preservatives, and anti-rusting agents.

A variety of fibers and fibrous materials can be treated with the inventive fiber or fabric treating agent composition, for example, by adjusting the emulsion of the composition to a suitable concentration, and applying the emulsion to fibers as by dipping, spraying or roll coating. The amount of the composition applied to fibers is not critical and varies with the type of fibers. As a general rule, an appropriate coating weight of the fluorinated polysiloxane is about 0.01 to 10% by weight based on the weight of fibers. The coated fibers are then dried by hot air blowing or in a heating furnace. The drying conditions include about 100 to 150° C. and about 2 to 5 minutes though they vary with the type of fibers.

Any desired type of fiber or fibrous material can be treated with the inventive fiber or fabric treating agent composition. The composition is effectively applicable to either natural fibers such as cotton, silk, hemp, wool, Angora and mohair, or synthetic fibers such as polyester, nylon, acrylic and spandex. Also the form and shape of fiber or fibrous material are not critical. Not only raw material forms such as staples, filaments, tows and threads, but also a variety of worked products including woven fabric, knitted fabric, wadding, and non-woven fabric can be treated with the inventive fiber or fabric treating agent composition.

There has been described a fluorinated polysiloxane which when fibers are treated therewith, imparts water and oil repellency to the fibers while maintaining a better texture than conventional fluorochemical oil repellents. It is useful in formulating a fiber or fabric treating agent composition.

EXAMPLE

Examples of the invention are given below by way of illustration and not by way of limitation. In Examples, the volatile content is measured at 105° C. for 3 hours and the viscosity is as measured at 25° C.

Structural Analysis by $^{29}$Si-NMR

A 10 mm diameter sample tube was filled with a uniform solution of 1.65 g of a sample, 1.50 g of toluene, 0.20 g of benzene-d$^6$, and 0.04 g of tris(2,4-pentanedionate)chromium as a shiftless relaxation reagent. Using Lambda 30 WB (JEOL), peaks of $^{29}$Si-NMR were observed through 600 to 3,000 times of integration.

Synthesis Example 1

A 500-ml glass flask equipped with a mechanical agitator blade, ester adapter, condenser and thermometer was charged with 227.4 g (0.160 mol) of α,ω-dihydroxy-dimethylsiloxane of the following average structural formula (i):

as component (A) and 17.8 g (0.080 mol) of N-β-(aminoethyl)-γ-aminopropyltrimethoxysilane. In a nitrogen stream, reaction was effected at 120° C. for 4 hours. Then 90.4 g (0.160 mol) of a fluorinated trimethoxysilane of the following formula (ii):

$$C_8F_{17}CH_2CH_2Si(OCH_3)_3 \qquad (ii)$$

was added to the reaction solution, which was stirred for 4 hours in a nitrogen stream. The reaction solution was heterogeneous immediately after the addition of the fluorinated trimethoxysilane, but became clear with the progress of reaction. After the completion of reaction, there was obtained a highly viscous, colorless, clear oily mass (A-1). This product was identified by $^{29}$Si-NMR structural analysis, with peaks and their attribute shown in Table 1.

TABLE 1

| Chemical shift (ppm) | The number of silicon atoms based on integral ratio | Attribute |
|---|---|---|
| −22.5 | 38.0 | CH$_3$<br>\|<br>—SiO—<br>\|<br>CH$_3$ |
| −53.2 | 2.0 | CH$_2$CH$_2$C$_8$F$_{17}$<br>\|<br>—Si—OCH$_3$<br>\|<br>OCH$_3$ |
| −59.1 | 1.0 | CH$_2$CH$_2$CH$_2$NHCH$_2$CH$_2$NH$_2$<br>\|<br>—SiO—<br>\|<br>OCH$_3$ |

It is seen from the analytical results and reaction route that all the fluorinated trimethoxysilane and N-β-(aminoethyl)-γ-aminopropyltrimethoxysilane had reacted with the siloxane polymer and the product has the following average structural formula (iii). The results of measurement of volatile content and rotational viscosity are shown in Table 3.

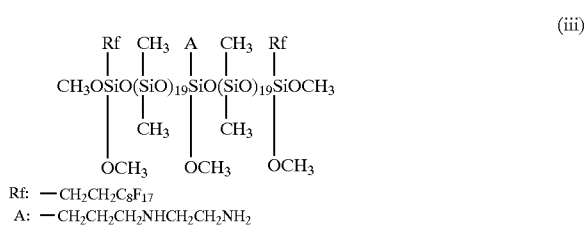

Synthesis Example 2

A 500-ml glass flask equipped with a mechanical agitator blade, ester adapter, condenser and thermometer was charged with 227.4 g (0.160 mol) of α,ω-dihydroxy-polydimethylsiloxane of the average structural formula (i) as component (A) and 33.0 g (0.16 mol) of N-β-(aminoethyl)-γ-aminopropylmethyldimethoxysilane. In a nitrogen stream, reaction was effected at 120° C. for 4 hours. Then 90.4 g (0.080 mol) of a fluorinated trimethoxysilane of the formula (ii) was added to the reaction solution, which was stirred for 8 hours at 150° C. in a nitrogen stream. The reaction solution was heterogeneous immediately after the addition of the fluorinated trimethoxysilane, but became clear with the progress of reaction. After the completion of reaction, there was obtained a highly viscous, colorless, clear oily mass (A-2). This product was identified by $^{29}$Si-NMR structural analysis.

It is seen from the analytical results and reaction route that all the fluorinated trimethoxysilane and N-β-(aminoethyl)-γ-aminopropylmethyldimethoxysilane had reacted with the siloxane polymer and the product has the following average structural formula (iv). The results of measurement of volatile content and rotational viscosity are shown in Table 3.

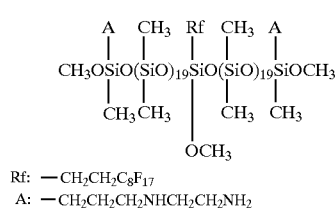

(12)

Rf: —CH$_2$CH$_2$C$_8$F$_{17}$
A: —CH$_2$CH$_2$CH$_2$NHCH$_2$CH$_2$NH$_2$

Synthesis Example 3

A 500-ml glass flask equipped with a mechanical agitator blade, ester adapter, condenser and thermometer was charged with 371.8 g (0.100 mol) of α,ω-dihydroxy-polydimethylsiloxane of the following average structural formula (v):

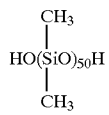

(v)

CH$_3$
|
HO(SiO)$_{50}$H
|
CH$_3$ as component (A) and 11.13 g (0.050 mol) of N-β-(aminoethyl)-γ-aminopropyltrimethoxysilane. In a nitrogen stream, reaction was effected at 120° C. for 4 hours, yielding a highly viscous, colorless, clear oily mass (A-3). This product was identified by $^{29}$Si-NMR structural analysis, with peaks and their attribute shown in Table 2.

TABLE 2

| Chemical shift (ppm) | The number of silicon atoms based on integral ratio | Attribute |
| --- | --- | --- |
| −12.8 | 2.0 | CH$_3$<br>\|<br>—SiO—H<br>\|<br>CH$_3$ |

TABLE 2-continued

| Chemical shift (ppm) | The number of silicon atoms based on integral ratio | Attribute |
| --- | --- | --- |
| −22.5 | 98.0 | CH$_3$<br>\|<br>—SiO—<br>\|<br>CH$_3$ |
| −59.1 | 1.0 | CH$_2$CH$_2$CH$_2$NHCH$_2$CH$_2$NH$_2$<br>\|<br>—SiO—<br>\|<br>OCH$_3$ |

It is seen from the analytical results and reaction route that all the N-β-(aminoethyl)-γ-aminopropyltrimethoxy-silane had reacted with the siloxane polymer and the product has the following average structural formula (vi). The results of measurement of volatile content and rotational viscosity are shown in Table 3.

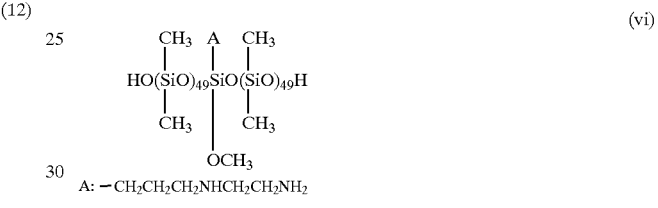

(vi)

A: —CH$_2$CH$_2$CH$_2$NHCH$_2$CH$_2$NH$_2$

TABLE 3

| Synthesis Example | 1 | 2 | 3 |
| --- | --- | --- | --- |
| Polymer | A-1 | A-2 | A-3 |
| Volatile content (%) | 1.1 | 1.2 | 0.9 |
| Rotational viscosity (cp) | 380 | 450 | 310 |

It is noted that the volatile content was measured by heating at 105° C. for 3 hours and that the rotational viscosity was measured by a rotational viscometer.

Examples 1–2 and Comparative Example 1

To 150 g of the fluorinated polysiloxane (A-1) or (A-2) obtained in Synthesis Example 1 or 2, was added 90 g of polyoxyethylene tridecyl ether (ethylene oxide added=10 moles, HLB=13.6). After mixing, 160 g of deionized water was added to the mixture, which was agitated for 15 minutes at a high speed by means of a homomixer, achieving phase inversion and thorough milling. Further, 600 g of deionized water was added to the emulsion for dilution, which was agitated for 15 minutes at 2,000 rpm by means of the homomixer, yielding a milky white emulsion.

The emulsion was diluted to an aqueous solution having a silicone solid concentration of 1.0% by weight. A polyester/cotton (65%/35%) mixed broad-cloth was dipped in the solution for one minute, nipped through rolls at a nipping rate of 100%, dried at 100° C. for 2 minutes and heat treated at 150° C. for 2 minutes. As an oil repellent test, one droplet of tetradecane was placed on the thus treated cloth, and the time taken until the droplet was completely absorbed in the cloth was measured. Water repellency was examined according to the water repellency test of JIS L-1092. The texture of the treated cloth was examined by finger touch before and after washing.

In Comparative Example 1, the above procedure was repeated using the polysiloxane (A-3) obtained in Synthesis Example 3.

The results are shown in Table 4.

Comparative Example 2

The procedure of Example 1 was repeated except that an aqueous solution having a solid concentration of 1.0% by weight was prepared using a fluorocarbon emulsion Scotch Guard FC-5102 (3M) instead of the fluorinated polysilixane used in Example 1, and a polyester/cotton (65%/35%) mixed broad-cloth was treated therewith. The results are shown in Table 4.

TABLE 4

|  | E1 | E2 | CE1 | CE2 |
|---|---|---|---|---|
| Fluid | A-1 | A-2 | A-3 | — |
| F content in polymer (wt %) | 15.8 | 8.7 | 0.0 | — |
| Tetradecane Absorption time (sec) | >300 | >300 | 8 | >300 |
| Water repellency by showering | 100 | 100 | 80 | 100 |
| Softness | Good | Good | Good | rough and hard |

Japanese Patent Application No. 11-324286 is incorporated herein by reference.

Reasonable modifications and variations are possible from the foregoing disclosure without departing from either the spirit or scope of the present invention as defined by the claims.

What is claimed is:

1. A fluorinated polysiloxane comprising at least one unit of the following general formula (1) and containing at least one aminoalkyl group attached to a silicon atom in a molecule,

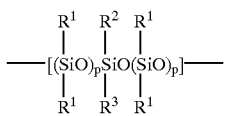 (1)

wherein $R^1$ is a substituted or unsubstituted monovalent hydrocarbon group of 1 to 20 carbon atoms, $R^2$ is a monovalent hydrocarbon group containing at least three fluorine atoms and $R^2$ is present in said fluorinated polysiloxane in an amount that provides said fluorinated polysiloxane with a fluorine content of at least 5% by weight, $R^3$ is an organoxy group represented by —$OR^1$ wherein $R^1$ is as defined above, and p is a positive number of from 2 to 200.

2. The fluorinated polysiloxane of claim 1 wherein $R^2$ is a group represented by the following general formula (3):

$$—CH_2CH_2C_nF_{2n+1} \quad (3)$$

wherein n is a positive number of at least 3.

3. The fluorinated polysiloxane of claim 1 wherein the aminoalkyl group is represented by the following general formula (4):

$$—R^4(NR^5CH_2CH_2)_aNR^6{}_2 \quad (4)$$

wherein $R^4$ is a divalent hydrocarbon group of 1 to 6 carbon atoms, $R^5$ and $R^6$ each are hydrogen or a monovalent hydrocarbon group of 1 to 8 carbon atoms, and "a" is equal to 0, 1 or 2.

4. A fluorinated polysiloxane having at least one terminal group of the following general formula (2) and containing at least one aminoalkyl group attached to a silicon atom in a molecule,

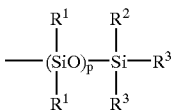 (2)

wherein $R^1$ is a substituted or unsubstituted monovalent hydrocarbon group of 1 to 20 carbon atoms, $R^2$ is a monovalent hydrocarbon group containing at least three fluorine atoms, $R^3$ is an organoxy group represented by —$OR^1$ wherein $R^1$ is as defined above, and p is a positive number of from 2 to 200.

5. The fluorinated polysiloxane of claim 4 wherein $R^2$ is a group represented by the following general formula (3):

$$—CH_2CH_2C_nF_{2n+1} \quad (3)$$

wherein n is a positive number of at least 3.

6. The fluorinated polysiloxane of claim 4 wherein the aminoalkyl group is represented by the following general formula (4):

$$—R^4(NR^5CH_2CH_2)_aNR^6{}_2 \quad (4)$$

wherein $R^4$ is a divalent hydrocarbon group of 1 to 6 carbon atoms, $R^5$ and $R^6$ each are hydrogen or a monovalent hydrocarbon group of 1 to 8 carbon atoms, and "a" is equal to 0, 1 or 2.

7. A fluorinated polysiloxane comprising at least one unit of the following general formula (1) and containing at least one aminoalkyl group attached to a silicon atom in a molecule,

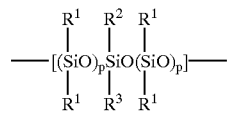 (1)

wherein $R^1$ is a substituted or unsubstituted monovalent hydrocarbon group of 1 to 20 carbon atoms, $R^2$ is a group represented by the following general formula (3):

$$—CH_2CH_2C_nF_{2n+1} \quad (3)$$

wherein n is a positive number of at least 3, $R^3$ is an organoxy group represented by —$OR^1$ wherein $R^1$ is as defined above, and p is a positive number of from 2 to 200.

8. The fluorinated polysiloxane of claim 7, wherein the aminoalkyl group is represented by the following general formula (4):

$$—R^4(NR^5CH_2CH_2)_aNR^6{}_2 \quad (4)$$

wherein $R^4$ is a divalent hydrocarbon group of 1 to 6 carbon atoms, $R^5$ and $R^6$ each are hydrogen or a monovalent hydrocarbon group of 1 to 8 carbon atoms, and "a" is equal to 0, 1, or 2.

9. The fluorinated polysiloxane of claim 2, wherein $R_2$ is $CH_2CH_2C_8F_{17}$.

10. The fluorinated polysiloxane of claim 3, wherein the aminoalkyl group is $CH_2CH_2CH_2NHCH_2CH_2NH_2$.

11. The fluorinated polysiloxane of claim 2, wherein $R^2$ is $CH_2CH_2C_8F_{17}$.

12. The fluorinated polysiloxane of claim 3, wherein the aminoalkyl group is $CH_2CH_2CH_2NHCH_2CH_2NH_2$.

13. The fluorinated polysiloxane of claim 2, wherein $R^2$ is $CH_2CH_2C_8F_{17}$.

14. The fluorinated polysiloxane of claim 3, wherein the aminoalkyl group is $CH_2CH_2CH_2NHCH_2CH_2NH_2$.

15. A fiber or fabric treating agent composition comprising as a main component the fluorinated polysiloxane of any one of claims 1 to 14, wherein said fluorinated polysiloxane is dissolved in an organic solvent or is emulsified in water.

16. A method for preparing a fluorinated polysiloxane comprising the step of effecting alcohol-elimination reaction among (A) a both end hydroxyl-blocked organopolysiloxane of the following general formula (5):

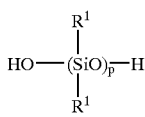
(5)

wherein $R^1$ is a substituted or unsubstituted monovalent hydrocarbon group of 1 to 20 carbon atoms, and p is a positive number of from 2 to 200, (B) a fluorinated triorganoxysilane of the following general formula (6):

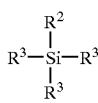
(6)

wherein $R^2$ is a monovalent hydrocarbon group containing at least three fluorine atoms, $R^3$ is an organoxy group represented by —$OR^1$ wherein $R^1$ is as defined above, in an amount that will provide said fluorinated polysiloxane with a fluorine content of at least 5% by weight, and (C) an aminoalkyl group-containing organoxysilane of the following general formula (7):

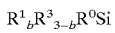
(7)

wherein $R^1$ and $R^3$ are as defined above, $R^0$ is an aminoalkyl group, and b is equal to 0 or 1.

17. A method for preparing a fluorinated polysiloxane comprising the step of effecting alcohol-elimination reaction among (A) a both end hydroxyl-blocked organopolysiloxane of the following general formula (5):

(5)

wherein $R^1$ is a substituted or unsubstituted monovalent hydrocarbon group of 1 to 20 carbon atoms, and p is a positive number of from 2 to 200, (B) a fluorinated triorganoxysilane of the following general formula (6):

(6)

wherein $R^2$ is a group represented by the following general formula (3):

—$CH_2CH_2C_nF_{2n+1}$ (3)

wherein n is a positive number of at least 3, and $R^3$ is an organoxy group represented by —$OR^1$ wherein $R^1$ is as defined above, and (C) an aminoalkyl group-containing organoxysilane of the following general formula (7):

$R^1{}_bR^3{}_{3-b}R^0Si$ (7)

wherein $R^1$ and $R^3$ are as defined above, $R^0$ is an aminoalkyl group, and b is equal to 0 or 1.

18. The method for preparing a fluorinated polysiloxane of claim 17, wherein the aminoalkyl group is represented by the following general formula (4):

—$R^4(NR^5CH_2CH_2)_aNR^6{}_2$ (4)

wherein $R^4$ is a divalent hydrocarbon group of 1 to 6 carbon atoms, $R^5$ and $R^6$ each are hydrogen or a monovalent hydrocarbon group of 1 to 8 carbon atoms, and "a" is equal to 0, 1, or 2.

* * * * *